(12) United States Patent
Vatn

(10) Patent No.: US 11,238,249 B2
(45) Date of Patent: Feb. 1, 2022

(54) METHODS AND DEVICES FOR TAGGING OF ANIMALS

(71) Applicant: DYREID AS, Oslo (NO)

(72) Inventor: Gudbrand Vatn, Oslo (NO)

(73) Assignee: DYREID AS, Oslo (NO)

( * ) Notice: Subject to any disclaimer, the term of this patent is extended or adjusted under 35 U.S.C. 154(b) by 0 days.

(21) Appl. No.: 16/616,337

(22) PCT Filed: May 23, 2018

(86) PCT No.: PCT/NO2018/050135
§ 371 (c)(1),
(2) Date: Nov. 22, 2019

(87) PCT Pub. No.: WO2018/217098
PCT Pub. Date: Nov. 29, 2018

(65) Prior Publication Data
US 2020/0160009 A1    May 21, 2020

(30) Foreign Application Priority Data

May 23, 2017  (NO) .................................... 20170849

(51) Int. Cl.
*G06K 7/10*    (2006.01)
(52) U.S. Cl.
CPC ..... *G06K 7/10475* (2013.01); *G06K 7/10128* (2013.01); *G06K 7/10237* (2013.01)
(58) Field of Classification Search
CPC ........... G06K 7/10237; G06K 7/10128; G06K 7/10475; G01S 5/02
(Continued)

(56) References Cited

U.S. PATENT DOCUMENTS

| 2002/0010390 A1 | 1/2002 | Guice et al. |
| 2005/0145187 A1 | 7/2005 | Gray |

(Continued)

FOREIGN PATENT DOCUMENTS

| WO | WO 03/058273 A1 | 7/2003 |
| WO | WO 2013/062418 A1 | 5/2013 |

OTHER PUBLICATIONS

Norwegian Search Report dated Dec. 22, 2017, for corresponding Norwegian Application No. 20170849, with English translation.

*Primary Examiner* — Allyson N Trail
(74) *Attorney, Agent, or Firm* — Birch, Stewart, Kolasch & Birch, LLP

(57) ABSTRACT

Methods and devices for providing access to identity information stored in an electronic chip in a system where a unique animal is tagged with an electronic chip and provided with a transponder configured to be able to read the electronic chip. The transponder stores the identity read from the chip in local memory and responds to information request messages by broadcasting the read identity as a beacon signal. The information request message is typically received from an authorized device, while the response beacon signal may be received by any device capable of receiving beacon signals. The identity code received as part of the beacon signal can be used by the receiving device to request access to information relating to the unique animal from a remote device. In some embodiments, the remote device may be equipment such as an electronically controlled gate, or a dispenser of animal food.

21 Claims, 7 Drawing Sheets

(58) Field of Classification Search
USPC .......................................... 235/451; 342/450
See application file for complete search history.

(56) References Cited

U.S. PATENT DOCUMENTS

| | | | |
|---|---|---|---|
| 2007/0131759 A1* | 6/2007 | Cox | G06K 19/0718 |
| | | | 235/380 |
| 2009/0058730 A1* | 3/2009 | Geissler | A01K 15/023 |
| | | | 342/450 |
| 2015/0282457 A1 | 10/2015 | Yarden | |
| 2018/0035640 A1* | 2/2018 | Lasher | G06K 19/14 |
| 2018/0137316 A1* | 5/2018 | Fischer | G06K 7/10366 |
| 2020/0160009 A1* | 5/2020 | Vatn | A01K 11/008 |

* cited by examiner

METHODS AND DEVICES FOR TAGGING OF ANIMALS

TECHNICAL FIELD

The present invention relates to a system for storing, updating and accessing information or accessing electronically controlled equipment associated with electronically tagged animals.

BACKGROUND

Radio Frequency Identification (RFID) is a process by which objects are uniquely identified by way of tags. RFID tags carry information relating to objects to which they are attached, and this information can be accessed using an RFID reader. RFID tags can be attached to or implanted in various objects, including goods and animals. When RFID tags are implanted in animals, for example in pets, the identity associated with the implanted device—typically a small chip inside a glass capsule—can be associated with owner contact information, name, description, medical information such as vaccinations, and veterinarian contact information. This information can be printed on certificates, stored in databases etc.

An RFID tag may be passive or active. An active tag includes its own power source, typically a battery, and they typically have a read range of up to 100 meters. Passive RFID tags do not have their own power source. Instead they are powered by the energy transmitted by the RFID reader. As a result, passive RFID tags have significantly shorter read range, in some cases up to about 25 meters, but often as close as near contact.

RFID tags designed to be implanted in animals are passive and typically include a microchip, or integrated circuit, a coil inductor and a capacitor. The chip carries the unique identification data and electronic components for encoding that information on a signal. The coil is configured to receive power inductively from the RFID scanner. The coil and capacitor together are tuned to the frequency of the RFID scanner, and receipt of a read request of this frequency causes the LC circuit comprised by the coil and the capacitor to produce sufficient power for the chip to transmit its data back through the coil such that it may be registered by the RFID scanner.

The components of an RFID implant is typically arranged inside a small glass capsule that can be injected with a syringe.

An RFID scanner is typically a dedicated device which is capable of transmitting a read request, receive and decode a response and display the information received as part of the response signal. A number of standards exist, allowing manufacturers to provide equipment that is able to interact. For example, when animal implants are designed according to standards, it is not necessary to know which producer manufactured the implant and to have a scanner provided by that manufacturer.

However, a dedicated RFID scanner may still be required, and an operator may need to process the received information manually, for example by manually entering the ID number read from the tag into a database in order to access available information.

It has previously been proposed to attach an RFID reader to a tagged object and include a radio transmitter in that RFID reader. An example is the present inventor's international patent application published as WO 2013/062418, which is hereby incorporated by reference in its entirety. That publication discloses a system for tracing a tagged object. That system is configured to trigger an alarm if the RFID reader does not receive a response from the RFID chip and to transmit that alarm using a radio transmitter that is part of the same unit as the RFID reader. The system may also include positioning means and sensors that can read biometric data.

Despite the numerous capabilities of the system referenced above, it is nevertheless limited to dedicated tasks and communication between two end points—the tagged object and the terminal which is the predetermined recipient of alarms or status messages.

A need for a more open and efficient ecosystem therefore exists with respect to RFID tagging in general, and RFID tags implanted in animals in particular.

SUMMARY OF THE DISCLOSURE

In order to address these needs methods, transponders and computer program products have been provided.

According to a first aspect of the invention a method is providing access to identity information stored in an electronic chip associated with an animal, the animal being tagged with the electronic chip and provided with a transponder configured to read the electronic chip and to receive and respond to information request messages. The method comprises reading an identity code from the electronic chip using the transponder, storing the identity code in memory in the transponder, receiving, in the transponder, an instruction to activate a beacon signal, and transmitting the identity code as a beacon signal.

In some embodiments the transponder includes or is in communication with a proximity sensor that is configured to detect the proximity of the animal, and the method further comprises setting an integrity flag in the memory, monitoring the proximity sensor, and, upon receiving indication of interrupted proximity, unsetting the integrity flag, and including a current value of the integrity flag when transmitting the beacon signal.

Some embodiments further comprise performing a determination of authorization, and wherein the instruction to activate the beacon signal is only executed upon a positive determination of authorization.

According to one embodiment the authorization is determined based on at least one of a previous pairing of the device transmitting the instruction with the transponder, a username and password, and a digital certificate, and a token authentication.

According to another aspect of the invention, a transponder is capable of providing access to identity information stored in an electronic chip associated with an animal, the animal being tagged with the electronic chip and provided with a transponder configured to read the electronic chip and to receive and respond to information request messages. The transponder includes a reader for reading an electronic chip, a memory, a wireless communication interface, a central processing unit configured to store an identity code read by the reader in the memory, receive an instruction to activate a beacon transmission over the wireless communication interface, and transmit the identity code as a beacon signal.

In some embodiments the transponder comprises a proximity sensor that is configured to detect the proximity of the animal, and the central processing unit is further configured to set an integrity flag in the memory, monitor the proximity sensor and unset the integrity flag upon receipt of an indication of interrupted proximity from the proximity sensor, and include a current value of the integrity flag when transmitting the beacon signal.

The proximity sensor may be selected from the group consisting of a buckle transmitting or interrupting a signal if it is opened, a light sensor covered by being in contact with the skin of the animal during normal operation, a capacitive sensor with characteristics depending on the closeness of an animal body, a resistive sensor detecting a change in the resistance between two electrodes that are in contact with the animal body during normal operation, and an inductive sensor responsive to changes in an inductive field as a result of the proximity of an animal.

In some embodiments the transponder is mounted to a collar for attachment around the neck of an animal implanted with the electronic chip.

The central processing unit may be configured to perform a determination of authorization, and wherein the instruction to activate the beacon signal is only executed upon a positive determination of authorization. This authorization is in some embodiments determined based on at least one of a previous pairing of the device transmitting the instruction with the transponder, a username and password, and a digital certificate, and a token authentication.

According to yet another aspect of the invention there is provided a method for accessing identity information stored in an electronic chip associated with an animal, the animal being tagged with the electronic chip and provided with a transponder configured to read the electronic chip and to receive and respond to information request messages. The method includes transmitting a first request to the transponder device instructing the transponder device to transmit a beacon signal, receiving, in response to the first request, a beacon signal including an identity code, the identity code being previously read from the electronic chip and stored in memory in the transponder, transmitting a second request to a remote device, the second request including the identity code, and receiving a response from the remote device, the response including at least a confirmation that the second request has been executed.

In some embodiments of this method the beacon signal further includes an integrity flag, the integrity flag indicating whether proximity between the transponder device and the animal has been interrupted subsequent to the reading of the identity code from the electronic chip, and method further comprises making a determination on whether to proceed based on the value of the integrity flag, and performing the transmitting and the second request to a remote device only if the determination is made in the positive.

The determination on whether to proceed may be based on a rule. This rule may, for example, restrict which requests can be transmitted to the remote device as the second request if the integrity flag indicates that integrity may have been compromised.

In some embodiments of this method, the transmitting of the first request instructing the transponder to transmit the beacon signal is done from a first device which has previously been paired with the transponder, and the receiving the beacon signal is done at a second device which has not been previously paired with the transponder. The second device which has not been previously paired with the transponder may be configured with credentials enabling authorization by the remote device.

The remote device is, in some embodiments, a database and the second request includes a request for information stored in the database and associated with the identity code, and the response includes the requested information.

In some embodiments the remote device is a database and the second request includes data associated with the identity code and a request to add, update or delete data in the database in based on the second request and the included data associated with the identity code.

In other embodiments the remote device may, for example, be an electronically controlled actuator configured to open a gate. The gate may, in various embodiments, be selected from the group consisting of: a gate preventing vehicles from passing, a gate preventing animals from passing, and a gate preventing animal food from being dispensed.

Also part of the invention is a computer program product stored on a computer readable medium and including instructions that enable a computing device to perform a method described above.

DETAILED DESCRIPTION

Figure 1:
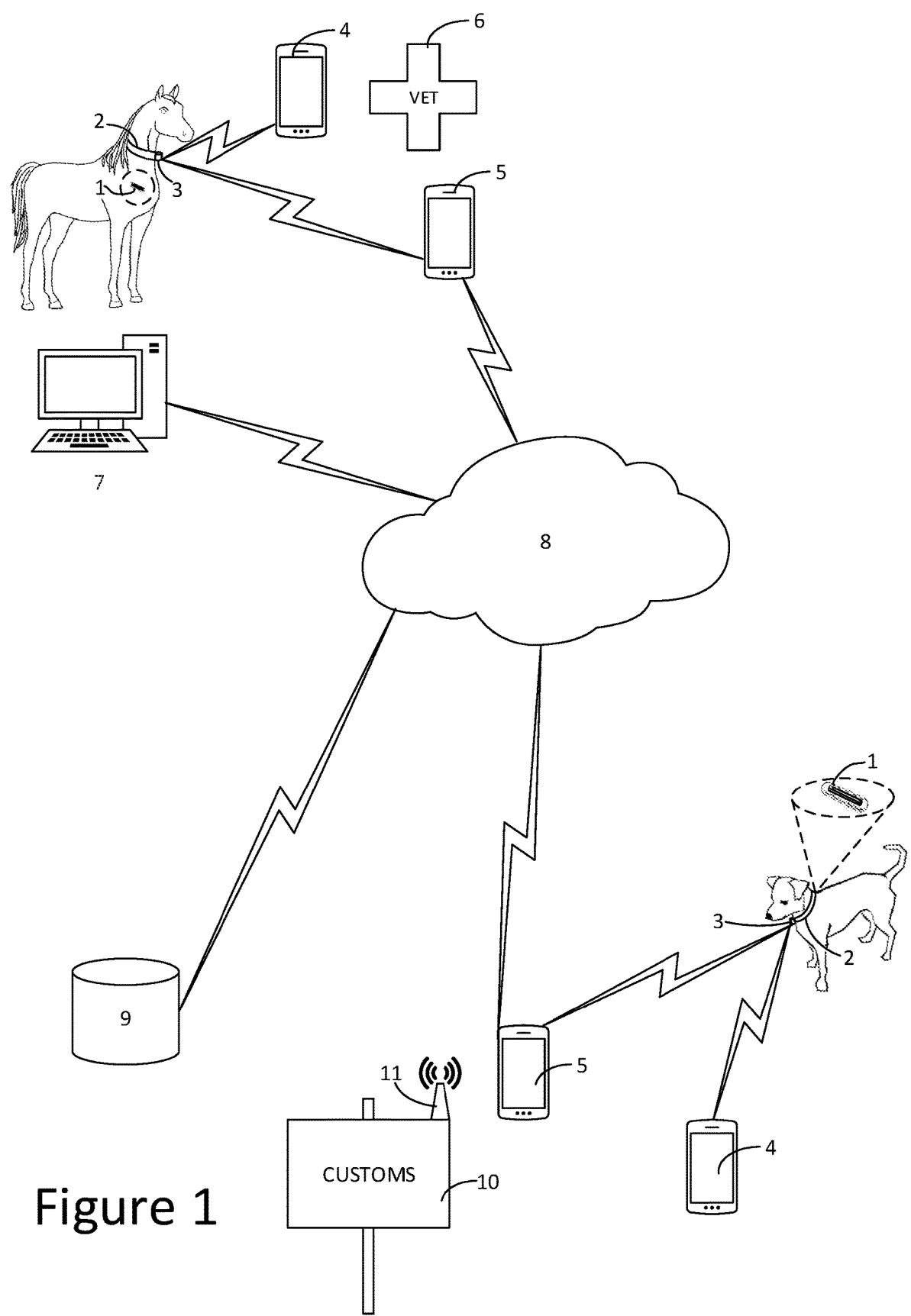
FIG. 1 illustrates a system capable of operating in accordance with the invention.

The present invention relates to methods, systems and devices for establishing an efficient infrastructure for RFID tagging and storage and retrieval of information associated with an RFID tag.

In the following description of various embodiments, reference will be made to the drawings, in which like reference numerals denote the same or corresponding elements. The drawings are not necessarily to scale. Instead, certain features may be shown exaggerated in scale or in a somewhat simplified or schematic manner, wherein certain conventional elements may have been left out in the interest of exemplifying the principles of the invention rather than cluttering the drawings with details that do not contribute to the understanding of these principles.

It should be noted that, unless otherwise stated, different features or elements may be combined with each other whether or not they have been described together as part of the same embodiment below. The combination of features or elements in the exemplary embodiments are done in order to facilitate understanding of the invention rather than limit its scope to a limited set of embodiments, and to the extent that alternative elements with substantially the same functionality are shown in respective embodiments, they are intended to be interchangeable, but for the sake of brevity, no attempt has been made to disclose a complete description of all possible permutations of features.

Furthermore, those with skill in the art will understand that the invention may be practiced without many of the details included in this detailed description. Conversely, some well-known structures or functions may not be shown or described in detail, in order to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Reference is first made to FIG. 1 which illustrates a system capable of operating in accordance with the invention. The system includes RFID chips 1 that may be implanted into the bodies of animals. Typically, an RFID chip 1 may be a tiny passive transponder operating in accordance with international standards ISO 11784 & 11785, although the invention is not limited to these standards. Alternatives include the Trovan Unique™ microchips provided by Trovan, Ltd. of United Kingdom, a system known under various names including FECAVA and Destron, as well as FriendChip provided by Avid Identification Systems, Inc. of California. Destron Fearing provides an RFID chip they call LifeChip®. The LifeChip is available with so called Bio-Thermo technology, which measures temperature and makes the measurement available to the RFID reader together with the RFID identity number. This added functionality expands the potential use cases for the present invention to include, for example, post-operative monitoring of body temperature.

The RFID chip 1 is typically encased in biocompatible soda lime or borosilicate glass and implanted in the animal using a syringe. The RFID tag carries limited information, usually only a unique ID number.

Passive RFID chips 1 can be read by dedicated RFID scanners, but the range is limited and such scanners are specialized equipment that may not be in the possession of all the persons and organizations that may wish to access reliable identity information associated with, for example, an animal. According to an aspect of the invention, an animal may therefore be provided with a collar 2 around the neck. The collar is provided with one or several transponders 3 capable of reading the RFID chip 1 and store and forward the information obtained from the RFID chip 1.

When a collar 2 is attached to an animal the transponder 3 will, upon activation, transmit a read request that is received by the RFID chip 1. The read request energizes and thus activates the RFID chip 1, which in turn transmit a response signal carrying its identity information. When the identity information is received by the transponder 3 it is stored in the transponder.

The transponder may be configured to be activated by signals received from a smartphone 4, and to execute instructions received from the smart phone 4. One such instruction may be that the transponder should transmit the identity obtained by reading the RFID chip 1 and stored in the transponder. This transmission may be in the form of a response signal or a broadcast signal.

The response signal may be received not only by the smartphone 4 that issued the instruction, but also by other smartphones or devices 5 in the vicinity of the transponder. In this way the identity may be read by any smartphone or compatible device 5, but only if an instruction has been issued by an authorized smartphone 4 first.

Thus, the combination of a transponder 3 attached to the animal and capable of reading the RFID chip with generic smartphone devices 4, 5 capable of receiving information from the transponder facilitates reading of implanted RFID chips 1 without the use of dedicated RFID readers.

Of course, it will still be possible to read the implanted RFID chip 1 using a dedicated reader for persons that are in possession of such equipment. For example, a veterinarian 6 may either use a dedicated RFID reader (not shown) or a smartphone or similar device 5 to obtain the identity number carried by the implanted RFID chip 1 and with the use this number and either the smartphone 5 or a personal computer 7, a laptop, or some other device to access local medical journals as well as a centralized database, such as Europetnet.

Most veterinarians may have dedicated RFID readers available to them at least in their clinics or hospitals. However, the possibility of reading the identity of an animal using a smartphone 5 and using that same device to access online databases with medial information related to that individual animal may enable simplified access to such information in the field, particularly if a situation arises suddenly and the veterinarian does not have any opportunity to obtain equipment that is stored elsewhere.

However, the increased opportunities and added convenience provided by the present invention may be even more attractive to other users. An example is illustrated in FIG. 1 as a border crossing 10 where it may be required by law that animals are identified and that proof of vaccinations and/or medical tests are provided. The present invention provides several opportunities in such a situation. By default it will, of course, always be possible for a customs officer to use a dedicated RFID reader (not shown) to read an RFID chip 1 implanted in an animal directly. Thus, the present invention does not disrupt methods that are already in place. Another option is to activate the transponder 3 as described above. This may, for example, be done by the owner using their own smartphone 4 and a relevant app. When the transponder is activated, a customs officer may obtain the identity of the animal from the signal transmitted by the transponder using a smartphone 5. This identity can be used to access the relevant information from a database 9, where it may have been stored by a veterinarian 6 as described above. The customs officer may use the smartphone 5 to access this information, or the identification number may be transferred to e.g. a computer (not shown) from which the database 9 is accessed.

In addition, a local access point 11 may be provided at or near the border crossing 10. If the owner of an animal activates the transponder 3 attached to their animal prior to approaching the border crossing 10, the access point 11 may receive the transmitted identity information and forward this information to a computer used by a customs officer. In this way it will not be necessary for the customs officer to use any short range reader equipment. The required information will simply be made available as a result of the activation of the transponder 3 and the subsequent approach towards the access point 11 mounted at or near the border crossing 10.

Again it should be noted that even this method does not disrupt the possibility of falling back to earlier methods by using dedicated RFID readers for animals that are equipped with an RFID chip 1, but not with a collar 2 and transponder 3, or even by using an animal passport on paper provided with stamps and certificates related to vaccines and other medical information.

The use of a local access point 11 can be combined with a gate, alley or a similar arrangement in order to control individual animal's access to or exit from defined areas for example in connection with procedures or other veterinarian care, feeding etc.

It will be understood that the owner's smartphone 4 does not have to be in the proximity of the transponder 3 in order to activate the beacon signal. It is sufficient that it is able to communicate with the transponder 3. Thus, if an animal is missing and its location is unknown, the beacon transmitting function of the transponder 3 can be activated remotely. This can be done over any communication channel that is accessible to both the smartphone 4 and the transponder 3. In some embodiments, the transponder 3 is equipped with its own cellular device capable of communicating over a cellular network. In these embodiments, the beacon may be activated from virtually anywhere in the world, provided that both the cellphone 4 and the transponder 3 has cellular service.

Figure 2:
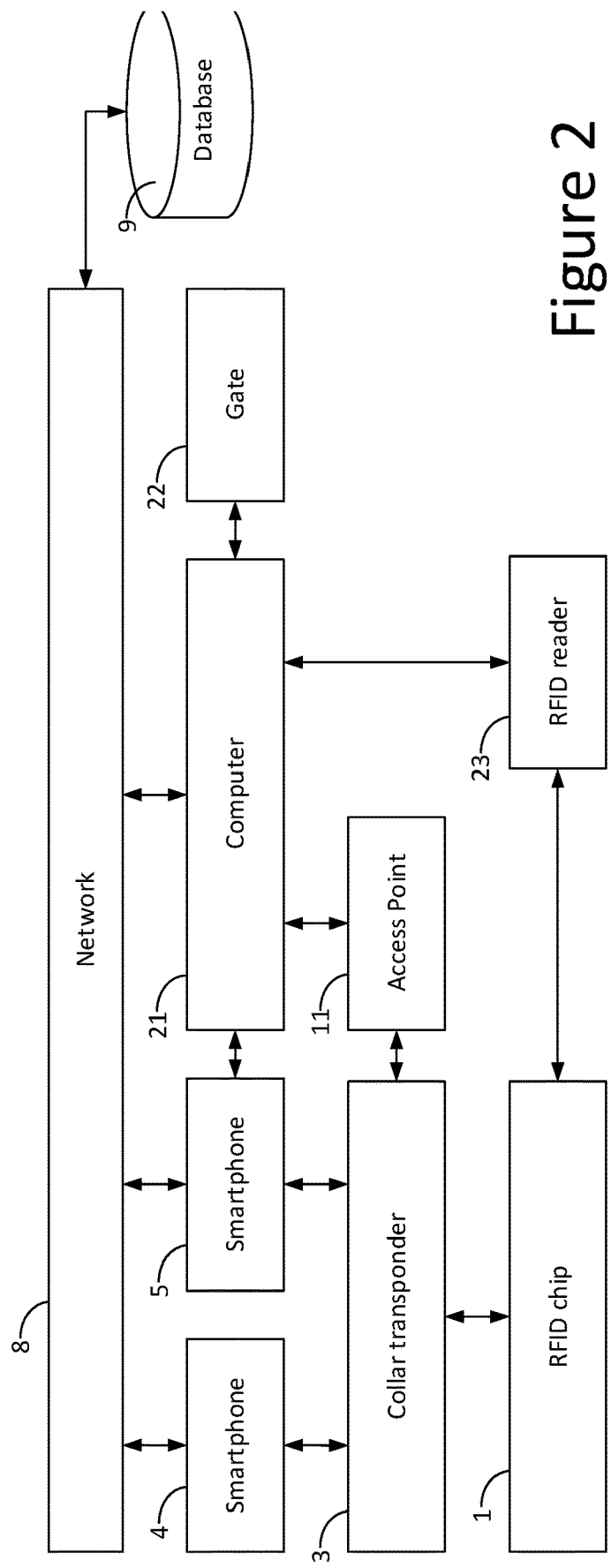
FIG. 2 shows a block diagram illustrating some of the devices that may be included in a system according to the invention.

Reference is now made to FIG. 2 which shows a block diagram illustrating some of the devices that may be included in a system according to the invention. The various devices or systems are connected by communication links. All the communication links are shown as bidirectional, but communication over some of these links may be substantially or only one way. Not all of the devices illustrated in FIG. 2 have to be present in systems that operate in accordance with the invention, and conversely a system may include other types of devices in addition to those that are illustrated here.

The drawing illustrates an RFID chip 1 which may be implanted in an animal. A collar transponder 3 is attached to the animal as described above. The collar transponder 3 is capable of reading the identity of the implanted RFID chip 1 and storing it in local memory. The collar transponder will be described in further detail below.

A first smartphone 4 is operated by the owner of the animal or some other person with responsibility for the animal or authority to activate, configure and instruct the collar transponder 3. A second smartphone 5 is operated by some person interested in obtaining the unique identity embedded in the RFID chip 1 and stored in memory in the collar transponder after the collar transponder has been attached to the animal and the RFID chip 1 has been read. Communication between smartphone 4, 5 and collar transponder 3 may be over Bluetooth, particularly Bluetooth Low Energy (BLE), but other standards may also be contemplated, for example ZigBee or Wi-Fi. The choice of an appropriate technology may be based on a tradeoff between range, reliability and energy consumption.

The smartphones 4, 5 are connected to a network 8. The smartphones will typically include several radio interfaces, for example cellular (GSM, GPRS, UMTS), Wi-Fi and Bluetooth, and in principle, communication with the network 8 may be over any of these interfaces. The network itself may be a combination of one or more of local area networks (LAN), cellular networks and wide area networks (WAN), particularly the Internet.

A database 9 is connected to the network 8 and can be reached by the smartphone devices 4, 5. Thus, a smartphone 4, 5 that has received a representation of an identity from a collar transponder 3 is not only able to display this identity on a display, but to use it to access information from the database 9, or even store or update information in that database.

As described above with reference to FIG. 1, an access point 11 may be provided at a specific point where an animal can be expected to pass. This may, for example, be at a border crossing, but may also be in the vicinity of a gate or door, a headgate, a feeding station or similar. The access point 11 may itself be a transponder that receives identity information from the collar transponder 3 over a short range radio link, for example BLE, and retransmits it using a longer range technology, for example Wi-Fi. The access point 11 may also be connected to a wired LAN. The retransmitted identity information may be received by a computer 21. Computer 21 may be a personal computer, a laptop, a tablet, or even a smartphone. It may also be a more special purpose device controlling other equipment, such as a gate 22, a lock, a feeding device or the like, for example by controlling an actuator that is configured to open and close such equipment.

If the computer 21 is operated by a user, for example a customs officer, it can be used to access information in the database 9. Thus, the user can use the computer 21 to obtain necessary information about an individual animal in order to, for example, determine whether the animal should be allowed to cross a national border. Other uses are, of course, possible, and some examples will be presented below.

In some embodiments of the invention a user may obtain an identity code using a smartphone 5, but prefer to enter this identity code in a computer 21 manually in order to perform operations on the database 9 using the computer 21 rather than the smartphone 5.

Furthermore, as also described with reference to FIG. 1, a dedicated RFID reader 23 may be used to read the information in the RFID chip 1 directly. The RFID reader 23 may display this information on a display or it may be connected to computer 21 and transfer the information to the computer 21. This will typically only be the case at some locations and to certain professionals, for example veterinarians in a hospital.

In some embodiments a computer 21 may be connected to additional equipment such as a gate 22, a feeding device or the like. It may then be possible to remotely allow an animal to pass through a gate or receive food simply by activating transmission of the beacon signal from the collar transponder 3. When the animal approaches the access point 11 the identity of the animal will be registered and transferred to the computer 21, and the computer 21 may in turn activate the equipment to open the gate 22 or release food. For the purposes of the present disclosure the term "gate" is intended to include any gate allowing or preventing an animal—or a vehicle transporting the animal—to pass, as well as any gate that is part of a feeding device and that must be opened in order for the feeding device to dispense food.

Figure 3:
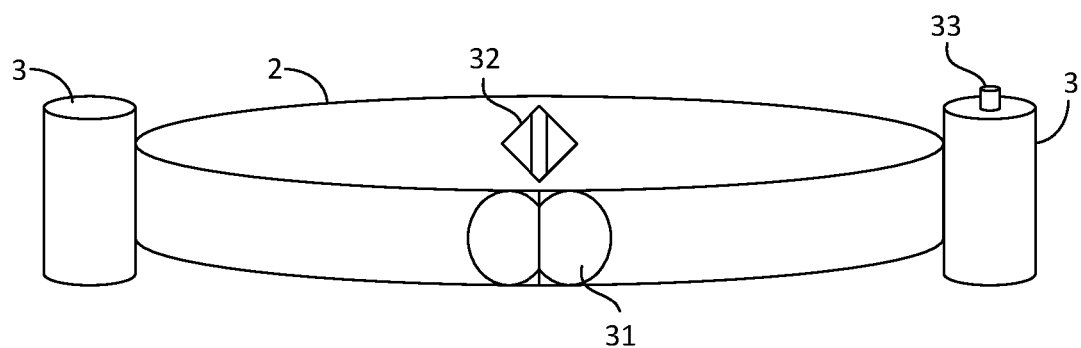
FIG. 3 shows an embodiment of a collar according to the invention.

Turning now to FIG. 3 an embodiment of a collar 2 will be described. In the illustrated embodiment the collar has two attached transponders 3, although it is consistent with the principles of the invention to attach any number of transponders. One may be considered sufficient in some designs, in other cases additional transponders may be deemed necessary or preferable. A reason for using several transponders may be to reduce the distance between the closest transponder and the implanted RFID chip 1 while still allowing the collar to be twisted and turned around the neck of the animal. This may particularly be considered for collars that are intended for larger animals such as cattle and horses.

At least one of the transponders may be equipped with one or more buttons or switches 33. The user interface provided by such buttons or switches 33 may be used to initiate reading of the RFID chip 1 or broadcasting of the identity information already read and stored in the transponder 3. However, some embodiments will not include any physical user interface and only allow receipt of instructions from a wireless device such as a smartphone 4.

In embodiments with more than one transponder 3, one of the transponders may be a master transponder which coordinates the transponders 3. Alternatively, the transponders may operate as peers that exchange information with each other.

As an alternative to multiple transponders, or as a supplement, a transponder may operate using several RFID antennas (not shown) that are embedded at several positions in the collar 2.

The collar 2 may further include a buckle 31. This buckle 31 may be provided with a physical and/or electronic lock. Thus the buckle 31 may require a physical or electronic key in order to be opened. The buckle may also be configured to communicate its status to at least one of the transponders 3.

In some embodiments at least one of the transponders—or the only transponder—may be configured to receive status information from the buckle 31. The transponder may be configured to perform one or more of the following functions.

Upon receiving information indicating that the buckle has changed status from open to closed and locked, the RFID reading process is initiated.

Upon receiving information that the buckle has changed status from closed and locked to unlocked and/or open, a status or flag indicating that the stored information may be compromised is set. Stored information (i.e., the stored identity of the animal that is wearing, or that last wore, the collar) may no longer be reliable if the collar 2 has been opened because the collar 2 may have been removed from the animal and perhaps moved to a different animal.

In embodiments with more than one transponders 3 the transponder that receives the status information from the buckle 31 may be configured to distribute this information to the other transponders 3, unless all this functionality is confined to one master transponder 3. Alternatively, the buckle may communicate with all the transponders 3 simultaneously, wirelessly or through wires embedded in the collar 2.

In some embodiments the buckle 31 may only include an electric or optical connection that is disconnected if the buckle is opened. This may be detected in one or more transponders 3. In other embodiments the buckle 31 includes additional electronics and is connected to a power source. The invention is not limited by how electronic circuitry is distributed physically.

In particular, one component, a proximity sensor 32 or proximity detector is shown in FIG. 3 as embedded in or attached to the inside of the collar 2. The proximity detector may operate on a number of well-known principles such as optical, capacitive or resistive detection of the proximity of an animal. The function provided by the proximity detector is to detect whether the collar 2 is removed from the animal. If this happens, it may be registered by the transponder 3 and stored in the form of a status or flag indicating that the stored information may be compromised.

Figure 4:
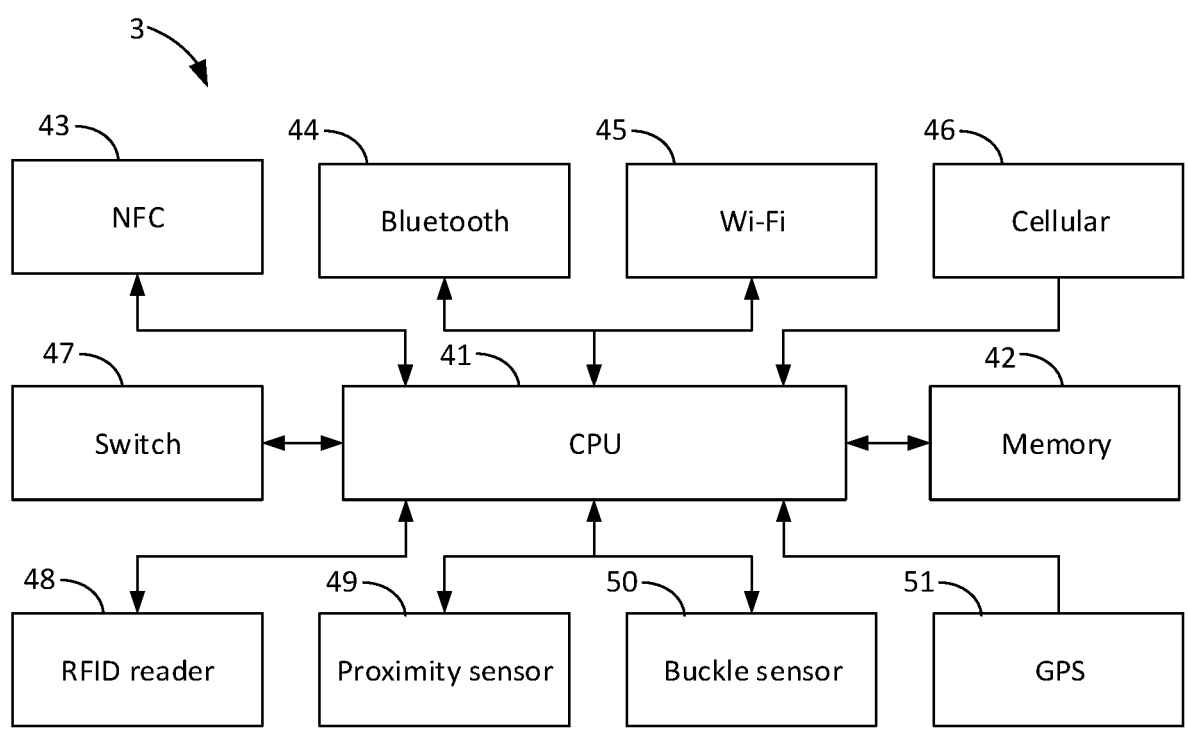
FIG. 4 is a detailed illustration of the various components included in a transponder.

With reference to FIG. 4 a more detailed description of the various components included in a transponder 3 will be given. This exemplary embodiment assumes that all the components or modules that are described are part of a single transponder. It should be understood that any of these components may be distributed between several physical components. For example, some components may be replicated in several transponders 3 or present in only one or a subset of a plurality of transponders 3 in order to provide functionality on behalf of all transponders 3. Some components may be embedded in the collar 2 or in separate housings attached to the collar rather than in the same housing as the transponder 3. Indeed, the transponder 3 itself may be distributed between several housings, for example by having the RFID reader located in a different housing than, for example, a Bluetooth or Wi-Fi transmitter.

The exemplary transponder 3 illustrated in FIG. 4 includes a CPU that is capable of executing instructions stored in local memory 42 and/or received over a communication interface. The exemplary embodiment includes four different wireless communication interfaces for communication with other systems and devices. A first wireless interface is provided by an NFC module 43, which is capable of communicating with another electronic device with similar capabilities, for example a smartphone 4, 5. NFC is often used to provide configuration information enabling two devices to communicate using a different communication channel, for example Bluetooth. However, in some embodiments of the invention the NFC module 43 may be configured to provide other communication. It may, for example, be configured to respond to identity reading requests. A Bluetooth module 44 may also be included and configured to communicate with paired devices in order to receive commands to be executed by the CPU 41 and to transmit information regarding stored information and status. The Bluetooth module 44 may also be configured to transmit a beacon signal using one or more standards such as BLE, iBeacon, AltBeacon, URIBeacon and Eddystone.

A transponder 3 may also be provided with Wi-Fi 45, which may enable communication over longer ranges, and with higher speeds than what the Bluetooth interface 44 may be able to provide. The Wi-Fi interface 45 may, for example, be utilized in order to communicate with or configure the collar transponder 3 directly form a computer 7, 21, or allow reading of identity by way of an access point 11, as described above.

A radio interface configured to communicate over a cellular network may also be provided. The cellular interface 46 may implement one or more cellular communication standards such as (but not limited to) GSM, GPRS, UMTS, IS-2000, and LTE. The ability to communicate with the collar transponder 3 over a cellular network enables, among other things, activation of beacon signal transmission from virtually anywhere, and without knowing the location of the collar transponder 3. This can be of utility, for example, when an animal wearing the collar is missing. Activation of the beacon signal allows anyone in the vicinity of the animal to read the identity of the animal from the transponder 3 simply by using a smartphone 5 with an appropriate app.

Various embodiments of the invention may, in principle include any subset of the radio interfaces just described. The inclusion or exclusion of any one of these interfaces may affect the set of features that may be included, but only to the extent that a particular feature depends on a particular type of radio communication interface, as will be realized with people with skill in the art.

The switch module 47 represents the functionality associated with the switch 33. As described with reference to FIG. 3, one or more switches 33 may be available as a physical user interface. The user interface thus provided may be used to initiate reading of the RFID chip 1 or broadcasting of the identity information already read and stored in the transponder 3. However, some embodiments will not include any physical user interface and only allow receipt of instructions from a wireless device such as a smartphone 4.

An RFID module 48 includes the functionality and hardware necessary for reading the RFID chip 1 implanted in the animal wearing the collar 2. The RFID module may represent implementations of ISO 11784 & 11785 or other standards.

As already described, the collar 2 and transponder 3 may include additional sensor. A first such sensor may be a proximity sensor module 49, representing the proximity sensor 32 shown in FIG. 3 and corresponding hardware and software functionality. The proximity sensor module 49 is configured to register sensor input from the proximity sensor 32 indicating the presence or absence of an animal, i.e. whether an animal is currently wearing the collar 2. The proximity sensor module 49 may be configured to process this sensor input and determine whether the collar 2 has been worn continuously by the animal since the RFID chip 1 was last read by the RFID reader 48. The proximity sensor module 49 may be configured to, upon detecting that the continuous proximity of an animal has been interrupted, set a flag that is indicative of this fact and hence indicative of the fact that the collar may have been removed from the animal with the implanted RFID chip 1 that has been read and stored in the memory 42 of the transponder 3. In some embodiments, the proximity sensor module 49 may be configured to request a new reading by the RFID reader 48 if proximity to an animal is interrupted and then reestablished.

Similarly, a buckle sensor module 50 may be configured to detect opening or closing of the buckle 31 as described above. In some embodiments the buckle sensor module 50 is configured to initiate reading of the RFID chip 1 when the buckle is closed.

The last sensor module illustrated in this example is a GPS receiver 51. The GPS sensor module 51 receives GPS signals and determines position. This position may be used in a number of different functions. The invention may implement any subset of these functions, but the invention may also be implemented without any GPS functionality.

There are two types of functions that may be implemented based on the GPS. The first type is based on so called geofencing, where some functionality is activated based on the determined position. The other type involves some kind of position reporting—i.e., the transponder 3 may report its position to a remote recipient, for example over Wi-Fi 45 or cellular 46. Among the geofencing functions that may be contemplated are initiation of beacon signal transmission, and communication with other equipment, for example a request to open a gate, serve food etc. The two may, of course, be combined. A geofencing function could be to transmit an alarm message if the position is outside a permitted area, or inside a forbidden area, and this alarm message may include position coordinates.

Those with skill in the art will realize that the modules described with reference to FIG. 4 to a large extent may include a combination of hardware and software. Some of the hardware may be specific to the particular module, for example an antenna that is part of the RFID reader 48, while some hardware may be shared by several modules or generic to the device as such. Software instructions that are part of one of these modules may be stored in memory 42, which may be a combination of several types of memory, including RAM, ROM, EEPROM, flash memory, etc.

Figure 5:
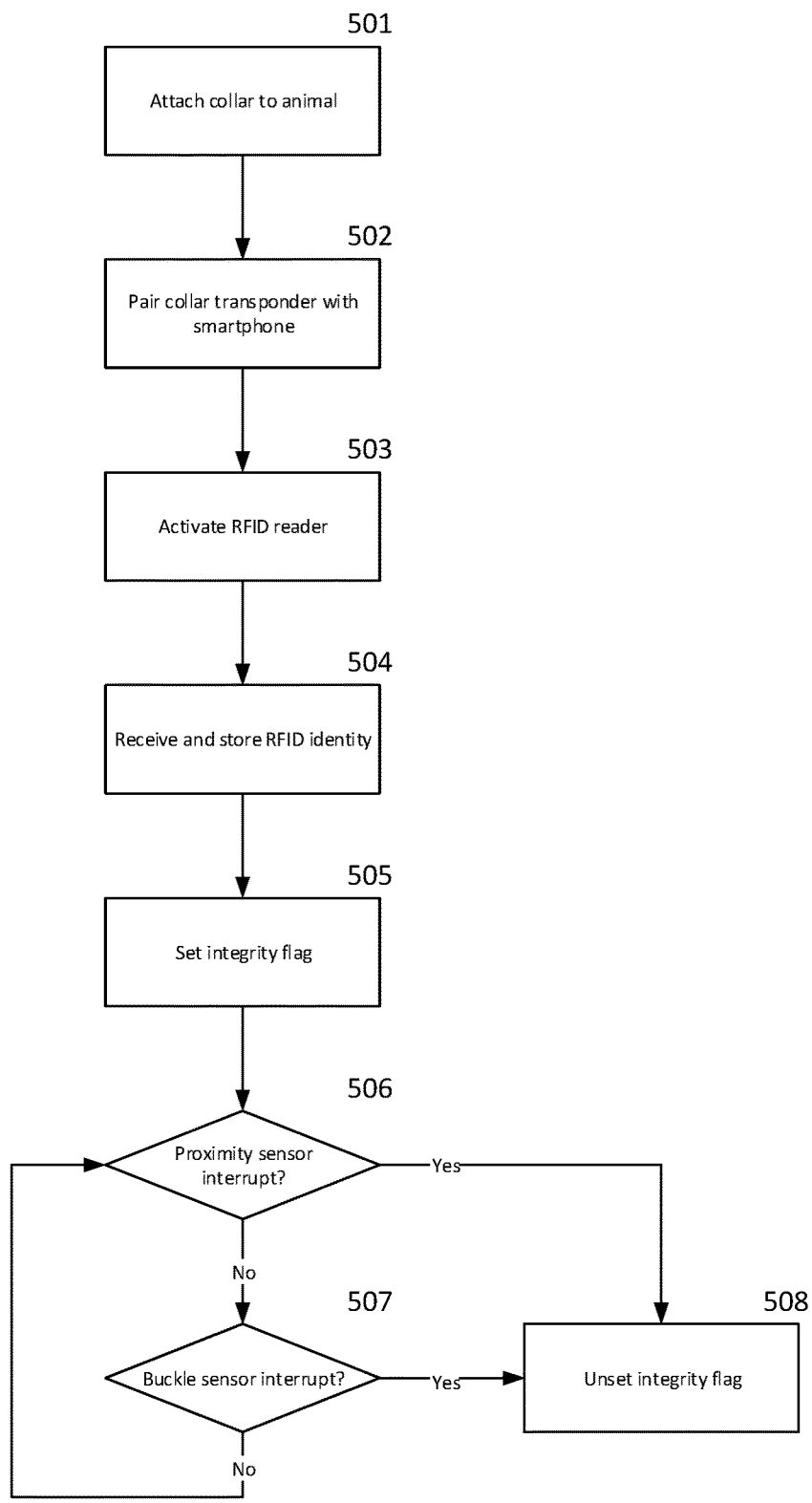
FIG. 5 is a flowchart illustrating a method of attaching a collar with a transponder to an animal that is carrying an implanted RFID chip.

Reference is now made to FIG. 5, which is a flowchart illustrating a method of attaching a collar 2 with a transponder 3 to an animal that is carrying an implanted RFID chip 1.

In a first step 501, the collar is attached to the animal. In embodiments of the invention that include the proximity sensor 32, 49 and/or the buckle sensor 50, these may be activated at this point. However, in some embodiments they may be activated later, for example as part of the reading of the RFID chip 1 implanted in the animal.

The process then moves on to step 502, where the collar transponder 3 is paired with a smartphone 4. Various embodiments of the invention may allow this pairing to happen prior to attachment of the collar 2 to the animal, or subsequent to some of the steps described below, but a smartphone 4 or some similar device must be paired with the collar transponder in order to be able to issue instructions to the collar transponder 3. The pairing may be a simple Bluetooth pairing process, but it may also involve other types of authorization based on methods that are well known in the art, including use of passwords, digital certificates, two step verification and other methods that are known to people of ordinary skill.

In a next step 503 the RFID reader is activated. This activation may be the result of the transponder receiving an activation signal from the smartphone 4 that was paired with the collar transponder 3 in the previous step. However, other options are within the scope of the invention, including automatic initiation based on signals from the buckle sensor 50 and the proximity sensor 32, 49, as well as manual activation using a physical user interface on the collar transponder 3, such as switch 33, 47. In embodiments where a minimum of security and integrity is required, e.g. where it should not be possible for just anyone to move the collar 2 from one animal to another and replace the original identity with the identity of the new animal, a physical user interface 33, 47 should include or be supplemented with security measures such as security codes, keys, or communication with external devices.

As a result of the activation of the RFID reader, a read request signal is transmitted by the RFID reader 48, and provided that an RFID chip 1 is within range, a response signal should be received in step 504. The response signal should include a valid identity which can be stored in memory 42.

After a valid identity code has been received and stored, an integrity flag can be set in memory 42 in step 505. The integrity flag may be a single bit representing whether the collar transponder 3 has been operating normally since the RFID identity was read in step 504, without occurrence of any event that may indicate a possible security breach. However, in some embodiments of the invention the integrity flag may be replaced or supplemented by a more detailed status record or log. In some embodiments the flag may be preset or set prior to reading of the RFID chip 1 and only unset upon detection of a possible security breach.

After the RFID identity has been read and stored in memory 42 and the integrity flag has been set, the collar transponder 3 is operational and may perform other tasks, as will be described in further detail below. The collar transponder 3 will now monitor its status in order to detect events that may be indicative of compromised integrity. In the exemplary method illustrated in FIG. 5 this is illustrated as a step 506 of determining whether the proximity sensor 32, 49 has detected an interruption in the proximity to the animal to which the collar 2 is attached, and a step 507 of detecting, using the buckle sensor 50, whether the buckle 31 has been opened. As long as neither of these events has occurred, the collar transponder 3 will remain in this state. If one of these events is detected, the process moves to step 508, where the integrity flag is unset, and any additional relevant information regarding the event or the status of the collar transponder 3 may be stored in memory 42.

The determining steps 506, 507 do not have to be performed as periodic checks that are performed sequentially. Typically, they will be performed as routines triggered by events communicated from the respective sensor. Embodiments with none or only one of these sensors will, of course, not include a determination for sensors that are not present. Conversely, embodiments with additional sensors or states that may be indicative of corrupted or compromised data may include additional determination steps not shown in FIG. 5.

What happens after the user integrity flag is unset in step 508, or some corresponding action is performed in the form of an adequate status update, may vary in different embodiments. Some embodiments will not perform any subsequent step as a result of the unsetting of the integrity flag, but only include this fact when status information is transmitted by the collar transponder 3. In other embodiments, the unsetting of the integrity flag in memory 42 may initiate an attempt at re-reading the identity of the RFID chip 1 implanted in the animal. If the identity received from the RFID chip 1 is the same as the one already stored in memory 42, the integrity flag may be set again. Otherwise, different rules can be implemented depending on the requirements of a particular embodiment. In some embodiments, the new identity may simply overwrite the old identity and the integrity flag may be set. In other embodiments, the new identity may overwrite the old identity, but the integrity flag remains unset. Yet another option is to retain the original identity and not set the integrity flag if a different identity is received from the RFID chip. It would also be possible to delete the stored identity and replace it with an error message. The invention enables all these options as well as additional options, and leaves the specific rules to be implemented as a task to be determined by the designer of a given embodiment based on specific needs of a particular system.

Figure 6:
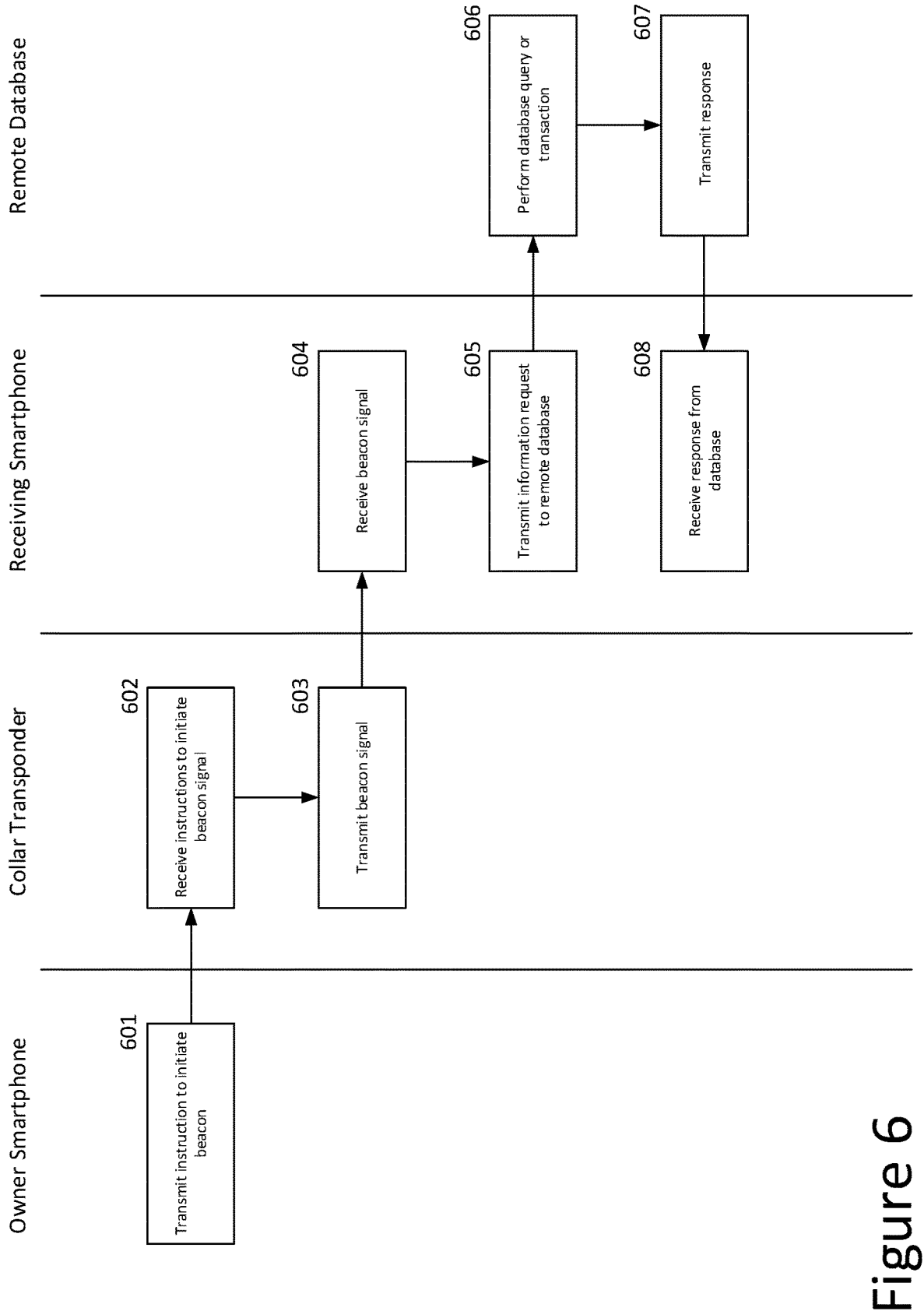
FIG. 6 shows a flow chart in the form of a swim lane diagram illustrating a process of providing information based on the identity stored in the RFID chip.

FIG. 6 shows a flow chart in the form of a swim lane diagram illustrating a process of providing information based on the identity stored in the RFID chip 1. The process starts with step 601 when the operator of an owner smartphone 4 opens an app installed on the smartphone 4 and issues an instruction to activate beacon transmission in the collar transponder 3. The instruction is transmitted to the collar transponder 3 using any wireless communication interface available. As mentioned above, various embodiments of the invention may implement different wireless communication channels between smartphones 4, 5 and transponder 3, and all or any subset of the examples already described may be available for transfer of such instructions. Additional options include, for example, infrared.

The instruction is received by the collar transponder 3 in step 602. In response to the received instruction the collar transponder starts transmitting the identity stored in memory 42 as a beacon signal in step 603.

The smartphone 4 that issued the instruction may be capable of receiving the beacon signal provided that it is close enough, something that may not be the case if the instruction is transmitted using the cellular network and the beacon signal is based on BLE (useful if an animal is lost), but will most likely be the case if the instruction is transmitted using Bluetooth and the beacon signal also uses Bluetooth (useful in order to provide an electronic passport at a border crossing).

More to the point, a receiving smartphone 5 within range of the beacon signal will receive the beacon signal in step 604. In some embodiments of the invention the receiving smartphone 5 may include an app which is capable of receiving the beacon signal and extract and display the identity information included in the beacon transmission. The app may furthermore be capable of transmitting a database query or some other instruction to a remote database in a following step 605. The exact nature of this request may depend on the embodiment of the invention as well as instructions given by the user of the recipient smartphone 5. The transmitted request may be a simple query for information, for example medical information required in association with a border crossing. The request may, however, also include instructions for a database transaction wherein data entered by the user is transmitted to the remote database 9 in order to update the database with the new information. This may for example be the case if the user is a veterinarian who has just administered a vaccine to the animal. It should be noted that the term request is used here because in many embodiments the data transmitted to the database 9 will be sent as an http request. The payload of that request may, of course, include database queries or parameters that will be used in database queries generated on the server side.

Communication between the recipient smartphone 6 and the remote database 9 may be over the network 8, which may be a combination of networks including privately owned local networks, a cellular network, etc. When the database 9 receives the query or transaction request, the necessary database operations are performed in step 606, provided, of course, that any necessary authentication and/or authorization can be performed successfully. Authentication and authorization may use any method well known in the art, and may be functionality that is included in the app performing the operations in the receiving smartphone 5.

The request that is transmitted by the receiving smartphone 5 and received by the database 9 may be an HTTP request, and a web server may serve as a front end for the database 9. However, other options are within the scope of the invention.

In step 607 the results of the database operations are transmitted from the database 9 to the receiving smartphone 5. In step 608 the receiving smartphone 5 receives the results and displays them to the user or processes them further, depending on the context of the specific situation and the information provided by the database.

Figure 7:
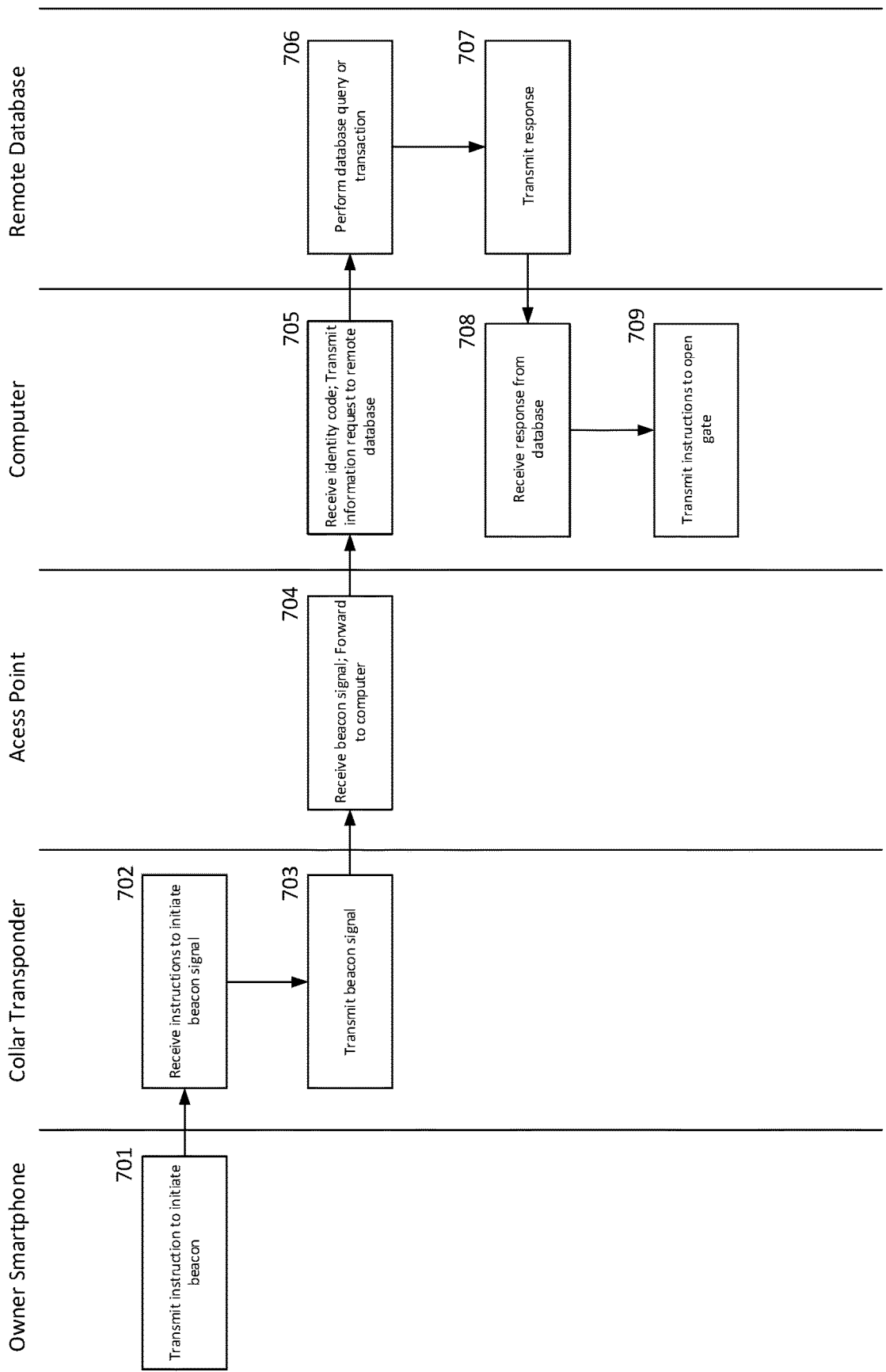
FIG. 7 is a swim lane diagram illustrating a process of providing information to an operator of a computer located in the vicinity of the tagged animal.

FIG. 7 is a swim lane diagram illustrating a process of providing information to an operator of a computer 7, 21 located in the vicinity of the tagged animal, but not sufficiently close to receive the beacon signal directly. This configuration could, for example, be convenient at border crossings where customs officials have to check the passports of animals and verify that the animals have received the necessary vaccinations. By providing an access point 11 that is capable of receiving beacon signals and forward them to a computer 7, 21 the customs official will not have to approach the animal in order to read an RFID chip 1, or a transponder 3.

This process starts with step 701, where the owner of the animal approaches the border crossing and decides to activate the beacon signal in the animal's collar transponder 3. This is something the owner can do through an app installed on their smartphone. The smartphone should be appropriately paired with the collar transponder as described above with reference to FIG. 5, and consequently, when the collar transponder 3 receives the instruction to initiate the beacon signal in step 702, this instruction will be accepted and the transponder 3 will respond by transmitting the beacon signal in step 703. When the animal is within the appropriate zone of the customs area an access point 11 or some other form of transceiver will receive the beacon signal and forward it on a local area network in step 704 such that it can be received by a computer workstation 7, 21. The computer workstation 7, 21 may be configured to, automatically or based on user input from a customs officer, transmit a request to a remote database 9. This step may be dependent on the value of the integrity flag described above. In some embodiments the identity code may not be accepted if the integrity flag indicates that the collar may have been temporarily removed from the animal or even transferred from another animal.

If the process is not interrupted as a result of an unset integrity flag, the request for information is transmitted to the database 9 where a query is performed in step 706. In step 707 the results of the query is transmitted back to the computer 7, 21. The results of the query is received in step 708, and provided that the results are acceptable, e.g. that all necessary vaccinations are found to be in order, as determined either by automatic rules programmed into the computer 7, 21 or as verified manually by a customs officer, a signal may be transmitted to open a gate 22 and allow the owner and the animal to cross the border.

It will be understood by those with skill in the art that while a system according to the invention may be substantially integrated and automated, such that for example steps of determination and activation of equipment like a gate can be performed by the computer 4, 21 more or less autonomously, it is consistent with the principles of the invention to allow a human operator to make decisions and implement them by entering user input to the computer 7, 21 or by operating other equipment that is not integrated with the system according to the invention.

It will further be understood that the invention is not defined by the kind of information that is handled. As such, the process just described could equally well relate to, for example, accessing, entering and updating information by a veterinarian, accessing, entering and updating information relating to the animal's participation in a sporting event or show, etc. As will be described below, the information may also be used to assist or automate operation of equipment for feeding or handling animals based on the identity and available information about the animal. The animal may be any mammal or other type of animal (reptile, bird etc.) that is large enough to be tagged with an electronic tag.

Figure 8:
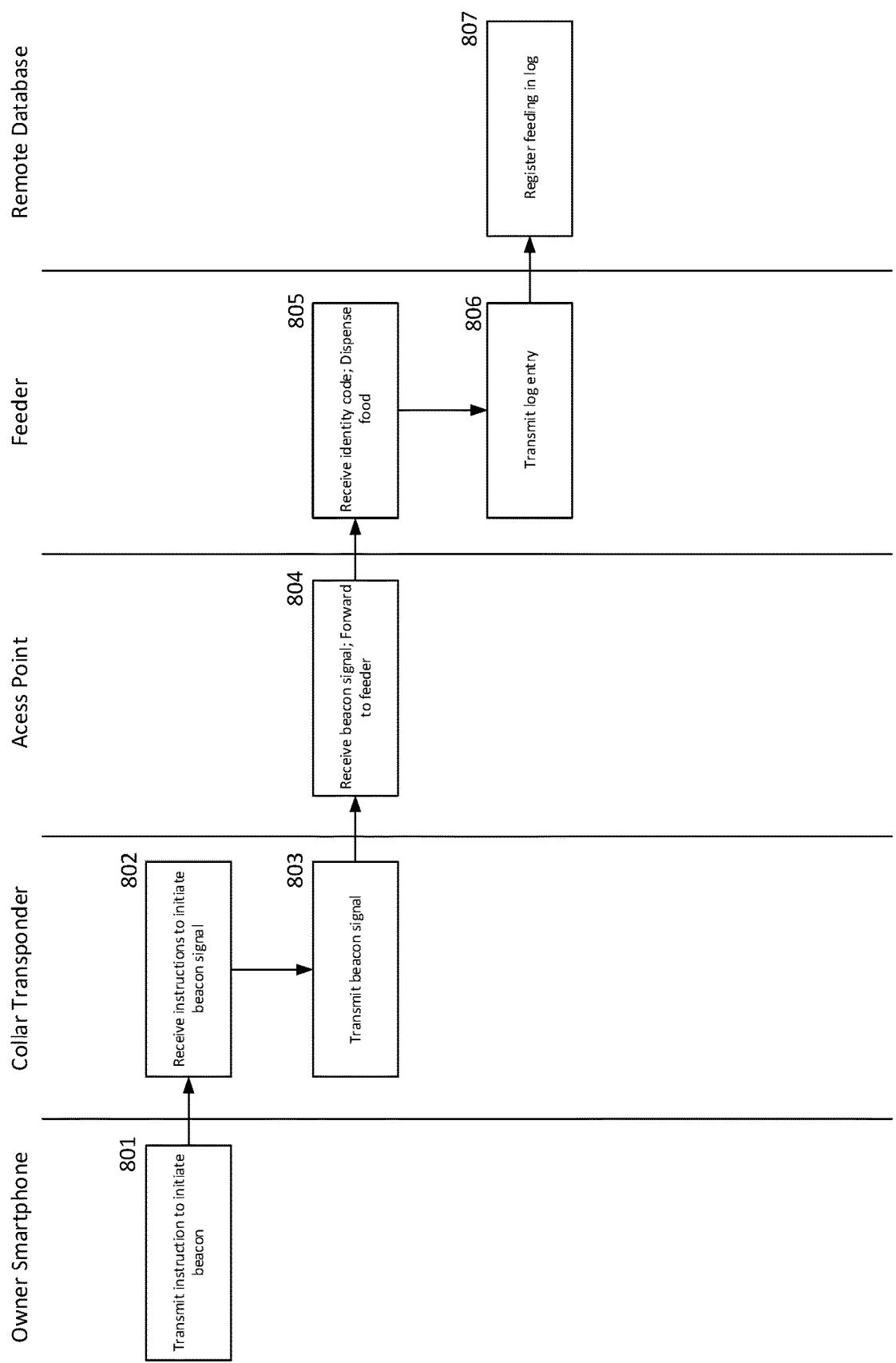
FIG. 8 is yet another swim lane diagram illustrating a process of providing food to an animal based on recognition of a beacon signal.

Reference is now made to FIG. 8 which is yet another swim lane diagram. The process illustrated in this drawing is one of providing food to an animal based on recognition of a beacon signal.

In a first step 801 an owner or caretaker transmits an instruction to initiate the beacon signal. In embodiments where the collar transponder 3 is provided with a GPS, or where other positioning is available, the owner may decide to activate the beacon signal based on information relating to the position of the animal with respect to a feeding device. As already described, the instruction may be transmitted using any available communication channel between the owner's smartphone 4 and the collar transponder 3, including but not limited to WiFi, WiMax, and cellular, and combinations of these.

The instructions are received by the collar transponder 3 in step 802, and provided that the instructions are authorized, e.g. based on the pairing of the smartphone with the collar transponder, or by other authorization verification means, the transmission of the beacon signal is initiated in step 803.

A wireless access point 11 may be attached to, integrated in or in communication with a feeding device. When this access point 11 receives the beacon signal in step 804, the received identity (and possibly the integrity flag, if it is deemed to be required for this application) is forwarded to the feeding device. For purposes of reference back to FIG. 2, the feeding device may be thought of as a combination of a computer 21 and a gate 22, where the computer is the electronics that control the feeding device and the gate is the actual dispensing mechanism.

In step 805 the feeding device receives the identity code of the animal and dispenses food. In some embodiments the feeding device will include a list of animals and their corresponding feeding schedules and dispense an amount or selection of food based on this information. In some embodiments the feeding devices may be in communication with a remote database 9 and able to request this information from the database 9. These steps are not illustrated in FIG. 8, but would correspond to steps 705, 706, 707 and 708 in FIG. 7, except that the information requested would be different.

The feeding device may be configured to keep a log of which animals are fed, when and with what. In some embodiments such a log may be kept locally in memory in the feeding device. In the embodiments illustrated in FIG. 8 the log is kept in a remote database 9. Consequently, in step 806 a log entry is transmitted to the remote database where it is received and stored in step 807. Some embodiments of the invention may not include a log of feeding operations. Similarly, while logging has not been discussed with respect to the processes illustrated in the previous flow charts, logging may, of course, be performed by any component of the system configured to be capable of performing such operations. This includes the smartphones 4, 5, the collar transponder 3, as well as any computer 7, 21, specialized equipment like a feeding device or an electronic gate, and of course the remote database 9.

In another embodiment of the invention the same process may be followed in order not to control a feeding device, but a gate, a head gate, a cattle chute (cattle race), a calf cradle, a squeeze chute (cattle crush), or other similar equipment.

It should be noted that while the embodiments disclosed herein include certain security measures like authorization of requests for activation of the beacon signal, proximity sensors combined with integrity flags in order to detect possible attempts to remove the transponder 3 or move it to another animal, and authentication and authorization for accessing the remote database 9, there may be ways for a determined attack to manipulate the system or otherwise overcome the security measures. A system according to the invention may, of course, be supplemented with additional security measures in order to make fraud even more difficult.

The invention claimed is:

1. A method for providing access to identity information stored in an electronic chip associated with an animal, said animal being tagged with said electronic chip and provided with a transponder configured to read said electronic chip and to receive and respond to information request messages, the method comprising:
   reading an identity code from said electronic chip using said transponder;
   storing the identity code in memory in said transponder;
   receiving, in said transponder, an instruction to activate a beacon signal;
   transmitting said identity code as a beacon signal.

2. A method according to claim 1, wherein said transponder includes or is in communication with a proximity sensor that is configured to detect the proximity of the animal, the method further comprising:
   setting an integrity flag in said memory;

monitoring said proximity sensor, and, upon receiving indication of interrupted proximity, unsetting the integrity flag; and including a current value of the integrity flag when transmitting said beacon signal.

3. A method according to claim 1, further comprising performing a determination of authorization, and wherein the instruction to activate said beacon signal is only executed upon a positive determination of authorization.

4. A method according to claim 3, wherein said authorization is determined based on at least one of a previous pairing of the device transmitting said instruction with said transponder, a username and password, and a digital certificate, and a token authentication.

5. A transponder for providing access to identity information stored in an electronic chip associated with an animal, said animal being tagged with said electronic chip and provided with a transponder configured to read said electronic chip and to receive and respond to information request messages, comprising:
   a reader for reading an electronic chip;
   a memory;
   a wireless communication interface;
   a central processing unit configured to
      store an identity code read by said reader in said memory,
      receive an instruction to activate a beacon transmission over said wireless communication interface, and
      transmit said identity code as a beacon signal.

6. A transponder according to claim 5, further comprising a proximity sensor that is configured to detect the proximity of said animal, and wherein said central processing unit is further configured to set an integrity flag in said memory, monitor said proximity sensor and unset the integrity flag upon receipt of an indication of interrupted proximity from said proximity sensor, and include a current value of the integrity flag when transmitting said beacon signal.

7. A transponder according to claim 6, wherein said proximity sensor is selected from the group consisting of:
   a buckle transmitting or interrupting a signal if it is opened, a light sensor covered by being in contact with the skin of the animal during normal operation, a capacitive sensor with characteristics depending on the closeness of an animal body, a resistive sensor detecting a change in the resistance between two electrodes that are in contact with the animal body during normal operation, and an inductive sensor responsive to changes in an inductive field as a result of the proximity of an animal.

8. A transponder according to claim 5, wherein said transponder is mounted to a collar for attachment around the neck of an animal implanted with said electronic chip.

9. A transponder according to claim 5, wherein said central processing unit is further configured to perform a determination of authorization, and wherein the instruction to activate said beacon signal is only executed upon a positive determination of authorization.

10. A transponder according to claim 9, wherein said authorization is determined based on at least one of a previous pairing of the device transmitting said instruction with said transponder, a username and password, and a digital certificate, and a token authentication.

11. A method for accessing identity information stored in an electronic chip associated with an animal, said animal being tagged with said electronic chip and provided with a transponder configured to read said electronic chip and to receive and respond to information request messages, the method comprising:
   transmitting a first request to said transponder device instructing said transponder device to transmit a beacon signal;
   receiving, in response to said first request, a beacon signal including an identity code, said identity code being previously read from said electronic chip and stored in memory in said transponder;
   transmitting a second request to a remote device, said second request including said identity code; and
   receiving a response from said remote device, said response including at least a confirmation that said second request has been executed.

12. A method according to claim 11, wherein said beacon signal further includes an integrity flag, said integrity flag indicating whether proximity between the transponder device and said animal has been interrupted subsequent to the reading of the identity code from the electronic chip, the method further comprising:
   making a determination on whether to proceed based on the value of the integrity flag, and performing said transmitting and said second request to a remote device only if said determination is made in the positive.

13. A method according to claim 12, wherein the determination on whether to proceed is based on a rule.

14. A method according to claim 13, wherein said rule restricts which requests can be transmitted to the remote device as said second request if the integrity flag indicates that integrity may have been compromised.

15. A method according to claim 11, wherein the transmitting of the first request instructing the transponder to transmit said beacon signal is done from a first device which has previously been paired with said transponder, and said receiving said beacon signal is done at a second device which has not been previously paired with said transponder.

16. A method according to claim 15, wherein said second device which has not been previously paired with said transponder is configured with credentials enabling authorization by said remote device.

17. A method according to claim 11, wherein said remote device is a database and said second request includes a request for information stored in said database and associated with said identity code, and said response includes the requested information.

18. A method according to claim 11, wherein said remote device is a database and said second request includes data associated with said identity code and a request to add, update or delete data in said database in based on the second request and the included data associated with said identity code.

19. A method according to claim 11, wherein said remote device is an electronically control led actuator configured to open a gate.

20. A method according to claim 19, wherein said gate is selected from the group consisting of: a gate preventing vehicles from passing, a gate preventing animals from passing, and a gate preventing animal food from being dispensed.

21. A computer program product stored on a computer readable medium and including instructions that enable a computing device to perform the method according to claim 11 when executed by a processor.

* * * * *